May 31, 1927.  
W. MARSHALL  
1,630,534  
DOOR WINDOW FINISH STRIP ASSEMBLY  
Filed July 19, 1926
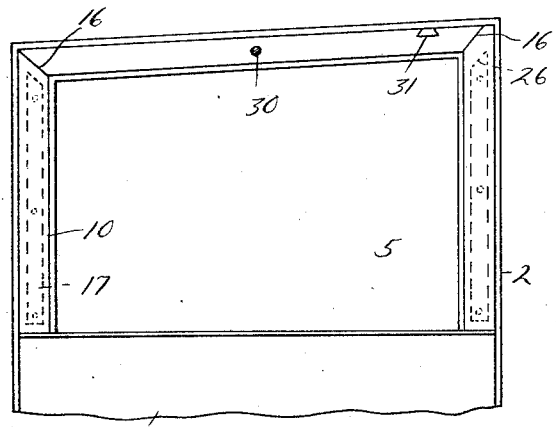
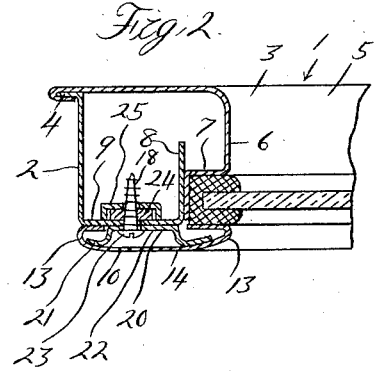
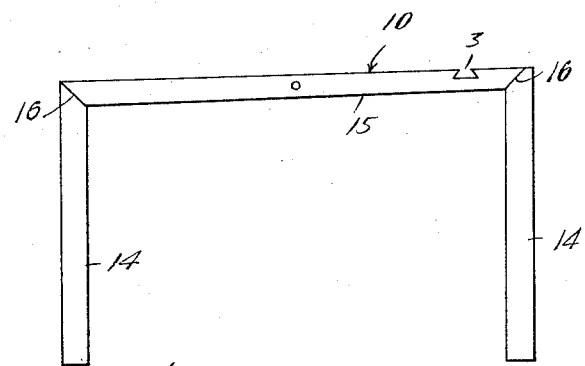
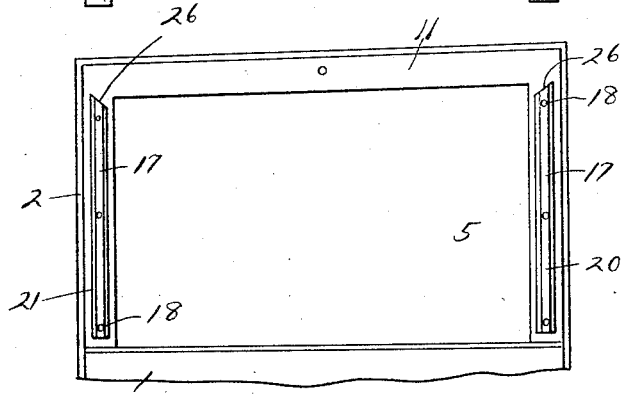
Inventor  
William Marshall  
By  
Attorneys Patented May 31, 1927.

1,630,534

UNITED STATES PATENT OFFICE.

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN.

DOOR-WINDOW FINISH-STRIP ASSEMBLY.

Application filed July 19, 1926. Serial No. 123,537.

This invention relates generally to finish strip assemblies primarily designed for use upon the doors of vehicle bodies and consists of certain novel features of construction, combinations, and arrangements of parts as will be more fully described and particularly pointed out in the appended claims.

In the accompanying drawing:

Figure 1 is an inside elevation of a finish strip embodying my invention applied to a vehicle door.

Figure 2 is an enlarged fragmentary cross sectional view through the construction shown in Figure 1.

Figure 3 is an inside elevation of the vehicle door with the retainer strips applied thereto and showing the finish strip removed.

Fig. 4 is a detail elevation of the finish strip.

Referring now to the drawing, 1 is a door of a vehicle body of the closed type having the spaced upright pillars 2 and the outer sheet metal panel 3. As shown, the pillars 2 are channel-shape and are provided with outwardly extending lateral flanges 4, while the panel 3 is secured at its edges to these flanges 4 and is provided between the pillars with a suitable window opening 5. To provide a neat appearance the panel 3 is provided at the side edges of the opening 5 with the lateral flanges 6 which extend inwardly and terminate at their inner edges with the L-shaped rabbets 7 that are secured to the side walls 8 of the pillars.

Heretofore suitable panels or strips of fabric trimming material have been secured to the inner walls 9 of the pillars to provide a neat appearance. With such constructions the fabric panels were substantially equal in width to the width of the inner walls 9 of the pillars, and separate molding strips were secured to the side walls 8 of the pillars to receive the window glass channels. With the present construction such separate molding strips and the fabric trim panels have been dispensed with entirely and I have provided a single finish strip 10 that constitutes the interior finish for the pillars and upper cross bar 11 of the door 2 and cooperates with the inturned lateral flanges 6 of the outer panels to form channels for the glass runways. As shown, the finish strip 10 is inverted U-shape in form and is provided along the longitudinal edges thereof with opposed open return-bent portions or flanges 13. Preferably the upright leg portions 14 of the U are integral with the transversely extending portion or base 15 and are butt welded along their meeting edges 16 to provide a neat and rigid construction.

To facilitate the assembly of the strip 10 to the door I have provided suitable anchorage or retainer strips 17 which are preferably rigidly secured to the inner walls 9 of the pillars by suitable headed elements such as the screws 18. As shown in Figure 2 the retainer strips 17 have the central longitudinally extending depressed portions and are arranged on the pillars 2 so that the bases 20 of the depressions seat against the inner walls 9 of the pillars, thereby spacing the marginal portions 21 of the strips away from the pillars and providing channels 22 of sufficient depth to receive the heads 23 of the screws. Any suitable means such as the nuts 24 may be retained in suitable stampings 25 on the inside of the channel pillars for receiving the screws 18. Thus with this construction the finish strip 10 may be easily and quickly applied to the door by merely slipping the leg portions 14 thereof downwardly along the retainer strips 17 so that the return-bent flanges 13 will embrace the marginal portions 21. To facilitate this assembly the upper ends of the retainer strips 17 are preferably bevelled as shown at 26 so that the leg portions 14 of the strip may be readily guided into proper engagement with the strip 17. When the transversely extending portion 15 of the finish strip is alongside of the upper cross bar 11 of the door, a suitable headed element such as the screw 30 is preferably used to secure the finish strip 10 in position. In fact only one set srew is necessary to hold the parts together. If desired, the transversely extending portion 15 of the finish strip may be provided with a recess 31 for receiving a suitable resilient buffer block for the door.

From the foregoing description it will be apparent that the finish strip conceals the inner face of the door at the sides and top of the window opening 5 and also cooperates with the flanges 6 of the outer panel to form channels for the glass runways 9. Inasmuch as the separate molding strips heretofore used have been dispensed with and only one screw 30 is required to retain the strip 10 in position, it will also be apparent that a considerable saving in time, labor and material has been effected. It will also be noted that the retainer strips 17 are relatively long and may be held in place by relatively few screws 18, hence these strips may be quickly secured in place and will suffice without providing a number of such strips to anchor the finish strip 10 upon the door. Such strips 17 also effectively guide the leg portions 14 of the finish strip to the proper position during the assembling operation.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. A door assembly comprising a door frame having upright pillars, a panel upon the outer sides of and secured to said pillars and having a window opening therein between said pillars and having inturned lateral flanges at the side edges of said opening, retainer strips upon the inner sides of and secured to the pillars, and a finish strip for the door carried by said retainer strips and cooperating with the flanges aforesaid to form channels for receiving window glass runs.

2. A door assembly comprising a door frame having a cross bar, and depending upright members at the ends of said cross bar, a one piece inverted substantially U-shaped finish strip for said frame having the base of the U extending longitudinally of said cross bar and having the leg portions of the U extending longitudinally of the said upright members anchorage strips for said finish strip secured to said upright members and disposed within the leg portions of said U-shaped finish strip, and means for maintaining said finish strip upon said anchorage strips including an element extending transversely of said cross bar.

3. A door assembly comprising a door frame having a cross bar, and depending upright members at the ends of said cross bar, an inverted substantially U-shaped finish strip for said frame having the base of the U extending longitudinally of said cross bar and having the leg portions of the U extending longitudinally of the said upright members, and anchorage strips for said finish strip secured to said upright members and disposed within the leg portions of said U-shaped finish strip.

In testimony whereof I affix my signature.

WILLIAM MARSHALL.